United States Patent [19]

Haas, Sr. et al.

[11] Patent Number: 4,550,655
[45] Date of Patent: Nov. 5, 1985

[54] APPARATUS FOR MAKING WAFER BLOCKS

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 631,391

[22] Filed: Jul. 16, 1984

[30] Foreign Application Priority Data

Aug. 1, 1983 [AT] Austria .................................. 2785/83

[51] Int. Cl.⁴ ........................ A21D 13/00; A23G 3/00
[52] U.S. Cl. .................................. 99/450.4; 99/450.7; 198/625
[58] Field of Search .......................... 99/450.1–450.7, 99/443 C, 644; 426/94, 103, 274, 275; 198/625; 414/49, 94

[56] References Cited
U.S. PATENT DOCUMENTS 4,440,072  4/1984  Haas, Sr. et al. .................. 99/450.4

Primary Examiner—Timothy F. Simone
Attorney, Agent, or Firm—Kurt Kelman

[57] ABSTRACT

Apparatus is provided which is used in combination with a machine for coating wafer sheets and serves to form wafer blocks built up in a downward direction. It is desired for avoiding damage to very large wafer sheets as they are assembled to form wafer blocks by means of helical conveyors, which rotate in mutually opposite senses about parallel axes and which move each wafer sheet into engagement with a stop and raise the wafer sheet from a first level to a second, higher level. This is accomplished in that each helical conveyor is provided with at least two helical wire flights, which extend parallel to each other around the axis of rotation of the conveyor. The helical flights of all helical conveyors define a common imaginary surface and support the wafer sheets on said surface. The novel apparatus as well as the wafer sheet coating machine is used in the industrial production of large wafer blocks, which constitute a starting product for the industrial manufacture of slices of wafer blocks.

12 Claims, 5 Drawing Figures

APPARATUS FOR MAKING WAFER BLOCKS

BACKGROUND OF THE INVENTION

1. Field of the Invention

This invention relates to apparatus for making wafer blocks in which each of a plurality of consecutive coated wafer sheets is joined to the underside of an uncoated or coated wafer sheet.

2. Description of the Prior Art

In the industrial manufacture of wafer blocks which are filled, particularly with cream, it is known to bake large wafer sheets in a wafer-baking oven including revolving baking tongs, then to coat said wafer sheets with a cream layer in a contact coating operation or film coating operation, and to apply each coated wafer sheet with its upwardly facing cream layer to the underside of an uncoated or coated other wafer sheet to form a wafer block. Such wafer blocks built up in a downward direction have previously been formed by means of two helical conveyors, which were rotated about parallel axes in opposite senses and in which each wafer sheet was engaged on the underside by a laterally extending, single helical flight and was moved in a direction of travel against a stop and raised from a first level to a second, higher level and was thus applied to the cover sheet of the wafer block or to the lowermost wafer sheet of the partly formed wafer block, which top sheet or lowermost sheet is disposed on said second level. When a wafer block has been completed, the stop is lowered and the wafer block is moved from the second level in the direction of travel to a delivery conveyor, which succeeds said stop.

Said wafer blocks are moved in the usual manner under a pressure roller and are then cooled and are cut by means of known wafer blocks slicers to form the commercially available sliced wafer products. Wafer material in a width of about 5 to 10 mm must be removed from the edges of the wafer block as waste to ensure that broken out edges of the wafer sheets and uncoated wafer sheet portions near the edges of the wafer block will not influence the weight of each package of the sliced wafer block product.

The known block-forming apparatus in which each wafer sheet is engaged on its underside only by two helical flights extending from opposite sides in highly satisfactory if the length of the wafer sheets measured transversely to the direction of travel does not exceed a certain upper limit. The width of each wafer sheet is measured transversely to its length and is about two-thirds of its length. The diameter of the helical flights supporting the wafer sheets is approximately as large as the width of each wafer sheet. In that case each wafer sheet will be supported by the helical flights at two points, each of which is spaced about one-third of the length of the wafer sheet from the adjacent end of the wafer sheet. If the ratio of the length of each wafer sheet (measured transversely to the direction of travel) to its width exceeds 1.5 and amounts to 2 or more, the cream-coated wafer sheet may not be adequately supported in its intermediate portion and may break owing to its own weight or may sag to such an extent that it will hinder or prevent the feeding of the next following wafer sheet into the block-forming apparatus. Both occurrences are intolerable for a statisfactory operation of the block-forming apparatus.

One of the reasons for the trend towards larger wafer sheets is the desire to reduce the proportion of waste formed when a wafer block is sliced to form a sliced wafer block product so that a higher productivity of labor can be achieved.

But considerations of baking technology have permitted an increase of the size of a wafer sheet only in its length but not in its width because in case of an increase in width the wafer sheet could not be adequately outgassed so that it would be useless.

Another reason why the known block-forming apparatus having only two helical flights is not satisfactory is due to the fact that the public desires wafer sheets having a very low specific gravity, i.e., very delicate wafer sheets, which necessarily have only a low strength so that the problems described hereinbefore will arise when such wafer sheets are coated with heavy and thick cream layers and are processed.

Whereas that problem might be solved by the provision of helical flights which are larger in diameter, the increase of the diameter of the helical flights is necessarily limited by the small width of the wafer sheet.

SUMMARY OF THE INVENTION

In accordance with the invention this disadvantage is eliminated by the provision of apparatus for making wafer blocks in which each of a plurality of consecutive coated wafer sheets is joined to the underside of an uncoated or coated wafer sheet, which apparatus comprises two helical conveyors rotating in opposite senses about substantially vertical, parallel axes of rotation and pushing each wafer sheet in a direction of travel against at least one stop, which is adapted to be lowered, preferably transversely to the direction of travel, which helical conveyors raise each wafer sheet from a first level to a second, higher level, and a delivery conveyor, which succeeds the stop in the direction of travel and serves to carry off the wafer blocks, said apparatus being characterized in that each helical conveyor comprises at least two parallel helical flights, which surround the axis of rotation of the helical conveyor and which consist of wire, the helical flights of all helical conveyors define a common imaginary surface and are adapted to support the wafer sheets on said surface, and, if desired, lateral guide rollers for guiding each wafer sheet are provided at least between adjacent helical flights of each helical conveyor, the guide rollers associated with each helical conveyor define a vertical guiding plane for the wafer sheets, and, if desired, guiding surfaces are provided for supporting the wafer sheets and the wafer block from below and precede and/or succeed the helical conveyors and each of said guiding surfaces extends into the region disposed between the two helical conveyors.

With that design, the absolute extent of the possible deflection of the coated wafer sheets is limited. In dependence on the size of each wafer sheet, two, three or more helical wire flights can be provided on each helical conveyor. If the wafer sheets are long and the outermost helical flight of each helical conveyor is large, each wafer sheet will have to travel over a relatively large distance in the helical conveyors until the wafer sheet engages the stop. The lateral guide rollers are provided to prevent a twisting of the wafer sheet during that travel. The guide rollers may be disposed throughout the region between the conveyor for feeding the wafer sheets to the helical conveyors and the conveyor for delivering the wafer blocks.

When the wafer sheets are very large and/or very delicate, the stress imposed on each wafer sheet when it enters the helical conveyors or when the wafer block leaves the helical conveyors should be minimized. This can be accomplished in that guiding surfaces are provided, which precede and succeed the helical conveyors. The provision of a guiding surface which succeeds the helical conveyors will be of particularly great advantage if the stop is disposed in the region between the two helical conveyors or between the helical flights thereof.

In accordance with the invention the radial distance between adjacent parallel helical flights of a helical conveyor may amount to 10 to 20% of the extent of each wafer sheet in the direction which is transverse to the direction of conveyance.

Also in accordance with the invention the diameters of the helical flights of each helical conveyor may be so selected that the helical flights are regularly distributed over the region disposed between the axes of rotation of the helical conveyors.

A further feature of the invention resides in that the diameter of the outermost helical flight of a conveyor screw is 1.5 to 2.5 times the extent of each wafer sheet, in the direction of travel.

DESCRIPTION OF THE PREFERRED EMBODIMENTS

Illustrative embodiments of the invention will now be explained more fully with reference to the drawings.

Figure 1:
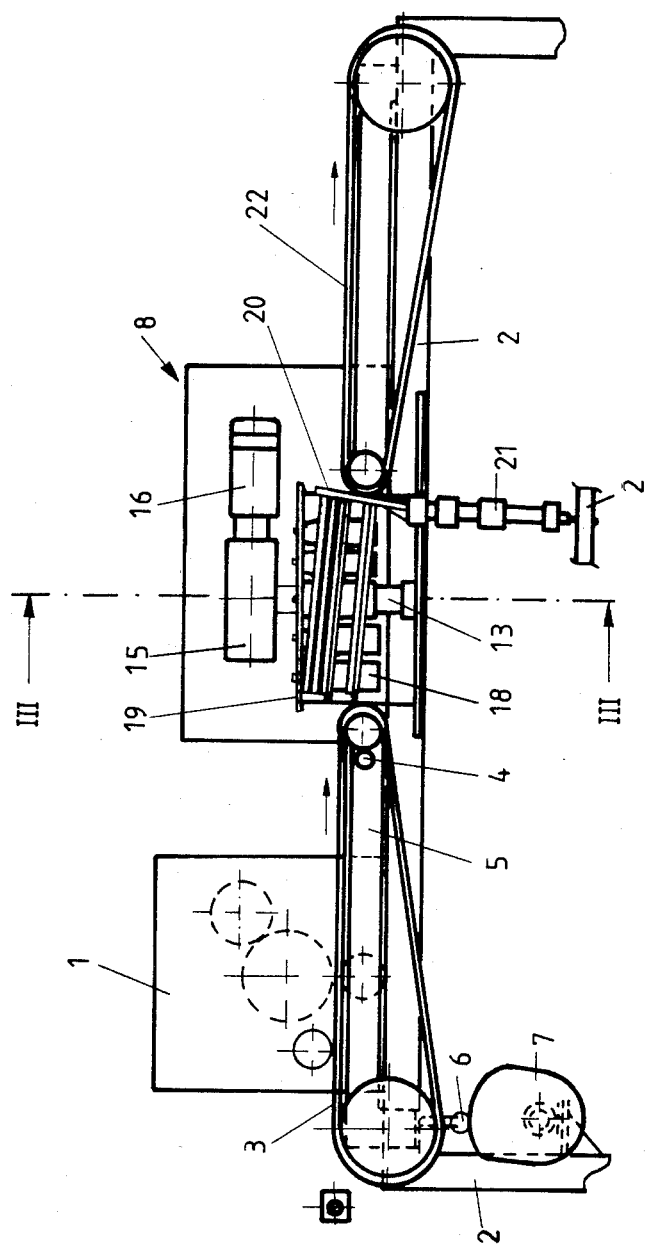
FIG. 1 is a side elevation of apparatus embodying the invention, which succeeds apparatus for applying cream or filler.
Figure 2:
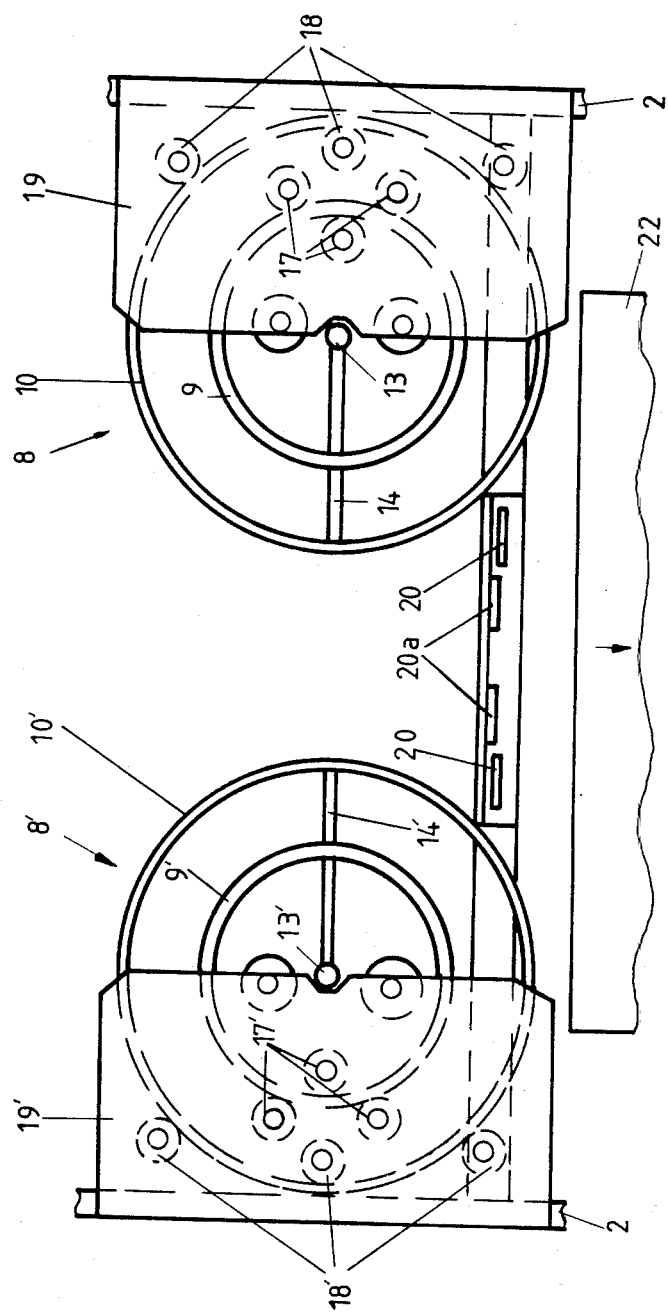
FIG. 2 is a top plan view showing apparatus according to the invention shown in FIG. 1.

As is apparent from FIG. 1, a known contact coating head 1 for coating wafer sheets is mounted on a machine frame 2. A belt conveyor 3 is associated with the coating head 1 and conveys each wafer sheet through the head 1. The belt conveyor 3 is accommodated in a frame 5, which is pivotally movable relative to the machine frame 2 about an axis 4. The frame 5 is provided at its rear end with a roller 6, by which the frame 5 is supported on a camwheel 7, which is rotatably mounted on the machine frame 2. The camwheel 7 can be rotated to lower the belt conveyor 3 relative to the coating head 1. As a result, a wafer sheet lying on the belt conveyor 3 can be moved past the coating head 1 without being coated.

It will be understood that this arrangement comprising a stationary coating head 1 and a lowerable belt conveyor 3 can be kinematically reversed in that a liftable coating head. The conveyors a non-lowerable belt conveyor are provided. Instead of contact coating heads for either of these known processes, a different contact coating head of a film coating head may be provided.

The coating head 1 and the associated belt conveyor 3 are succeeded by two helical conveyors 8, 8', which rotate in mutually opposite senses and are spaced apart transversely to the direction of travel and have generally vertical axes of rotation, which are parallel to each other and substantially at right angles to the plane in which the wafer sheets are transported by the belt conveyor 3. Each of the two helical conveyors 8, 8' comprises two helical wire flights 9 and 10 or 9' and 10', which extend parallel to each other around the axis of rotation of the respective helical conveyor 8 or 8' and rise opposite to the sense of rotation of the respective helical conveyor 8 or 8'. The two helical flights 9, 10 or 9', 10' of each helical conveyor 8 or 8' are secured by carrying rods 11, 12 or 11', 12', which are parallel to the axis of rotation of the helical conveyor, to a diametral carrying arm 14 or 14', which is secured to the lower end of a drive shaft 13 or 13'. The drive shaft 13 or 13' of each helical conveyor 8 or 8' is driven via a transmission 15 or 15' by a separate motor 16 or 16'.

Figure 3:
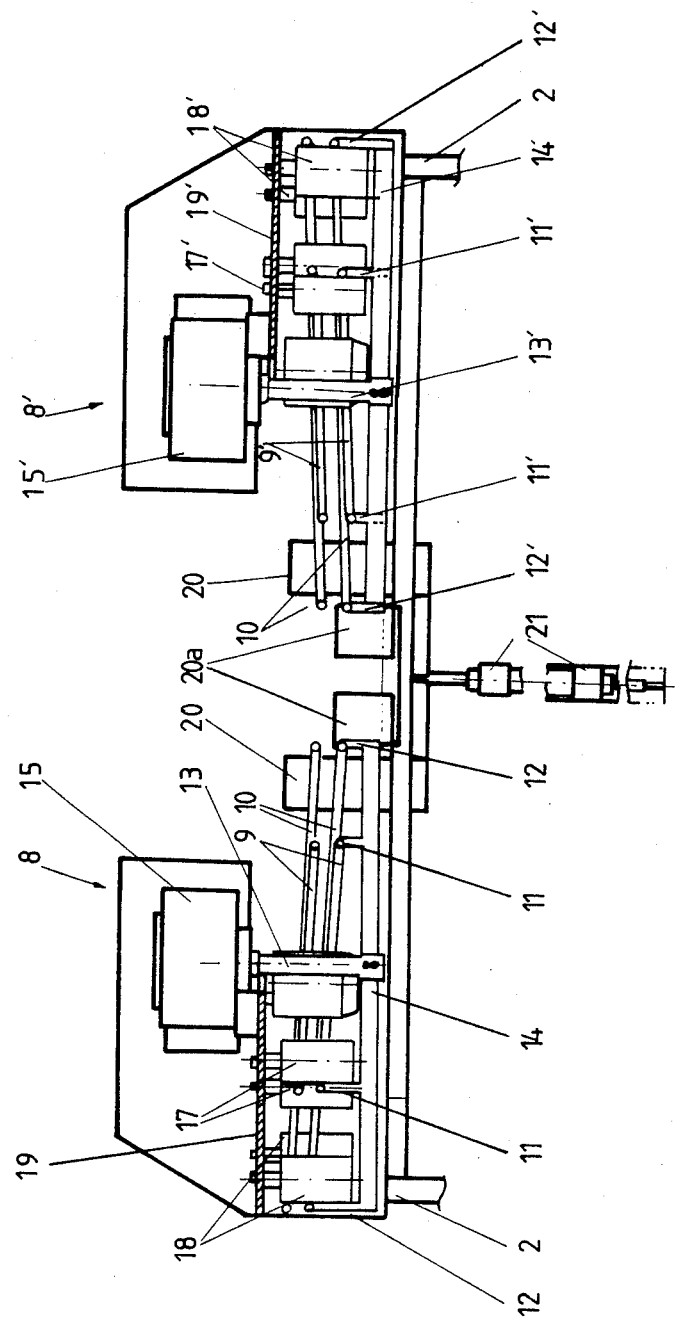
FIG. 3 is an enlarged sectional view taken on line III—III in FIG. 1.

Each helical flight 9, 10, 9' or 10' has preferably at least two convolutions and one-half of a convolution to one convolution of each helical flight extends below the plane in which the wafer sheets are conveyed by the belt conveyor 3. When the helical flights 9, 9', 10, 10' are stationary, each of said helical flights 9, 9', 10, 10' intersects said plane of conveyance in one point, which lies in the plane that is defined by the axes of rotation of the two helical conveyors 8, 8' and outside the region disposed between said axes of rotation. The helical flights 9, 10 or 9', 10' of all helical conveyors 8 and 8' define a common imaginary surface and support the wafer sheets in said surface. This is accomplished in that the two helical conveyors 8, 8' are oppositely handed and rotated in opposite senses at the same angular velocity and said helical flights are so arranged that any straight line which is normal to and connects said two axes of rotation and intersects one of said helical flights 9, 10, 9', 10' intersects all other of said more than two helical flights of both said helical conveyors, as is apparent from FIG. 3. In order to strengthen the helical flights 9, 9', 10, 10', backing rollers 17, 17' supporting the inner helical flight 9 or 9' and backing rollers 18, 18' supporting the outer helical flight 10 or 10' are provided in that region of each helical conveyor 8 or 8' which is disposed outside the region between their axes of rotation. The axles for the backing rollers 17, 18 and 17', 18' are mounted on carrying plates 19, 19', respectively.

A bipartite stop 20, 20a is provided on the delivery side of two helical conveyors 8, 8' and extends at right angles to the direction of travel. One stop member 20 protrudes above the helical flights 9, 9', 10, 10' and above the second level and is adapted to be lowered below the first or lower level by means of a pneumatic cylinder 21. Knives or the like are provided for removing any cream deposits from the stop member 20 as it is lowered. Thereafter, the stop member 20 is raised to a position in which it is slightly below the second or upper level. The other stop member 20a is stationary and secured to the machine frame 2 and protrudes only above the first or lower level.

The two helical conveyors 8, 8' move each wafer sheet against said two stop members 20, 20a and simultaneously raise the wafer sheet from the first or lower level to the second or upper level. In that operation each wafer sheet first slides along both stop members 20, 20a and subsequently slides only on the stop member 20. As the stop member 20 is lowered, the helical conveyors 8, 8' cause the wafer block formed on the upper or second level to move in the direction of travel to a delivery conveyor 22, which succeeds the stop member 20. When the stop member 20 is in its lower position, any wafer sheet disposed on the first or lower level will engage the stop member 20a.

The apparatus in accordance with the invention may be used in combination with coating machines in which the cover sheet of the wafer block and the coated wafer sheets are delivered to the apparatus on the same path, and in combination with coating machines in which the cover sheets and the coated wafer sheets are delivered on separate paths.

In the former case all wafer sheets of a wafer block are consecutively fed to the helical conveyors 8, 8' on the lower level and each of said wafer sheets is then advanced by the helical conveyors 8, 8' against the stop members 20, 20a and raised to the second or higher level so that each coated wafer sheet is attached to the underside of the preceding wafer sheet. As soon as a wafer sheet has reached the second or upper level, the helical conveyors 8, 8' are arrested and the next coated wafer sheet is fed to the helical conveyors 8, 8' on the first or lower level. When a wafer block has been completed, the stop member 20 is lowered and the helical conveyors 8, 8' by their next revolution cause the wafer block to be transferred on the upper level to the delivery conveyor 22. These operations are automatically controlled by suitable control means.

The second case differs from the first only in that the cover sheet of the wafer block is directly fed to the helical conveyors 8, 8' on the second or upper level by a conveyor which is not shown. This may be effected simultaneously with the introduction of the first coated wafer sheet, which is to be attached to the underside of the cover sheet and which comes from the coating head and is fed to the helical conveyors 8, 8' on the first or lower level.

In an embodiment of the invention, lateral guide rollers 23 and 23' are mounted on the carrying plates 19 and 19', respectively, and each of the guide rollers 23 and 23' is disposed inside one of the helical flights 9, 10, 9', 10' of the helical conveyors 8 and 8'. In each of the helical conveyors 8 and 8', the guide rollers 23 or 23' define a vertical guiding plane. That plane may be continued by guide rollers 24, which are disposed outside the helical conveyor, and may extend close to a belt conveyor for feeding the wafer sheets and/or to the delivery belt conveyor 22. Each guide roller 23, 23' extends below the lower level and above the upper level. A guiding surface 25 is disposed in the region between the two helical conveyors 8, 8' and supports each wafer sheet as it enters the helical conveyors 8, 8'. The guiding surface rises from below the lower level to said level and then extends on the lower level almost as far as to the helical conveyors 8, 8'.

Figure 5:
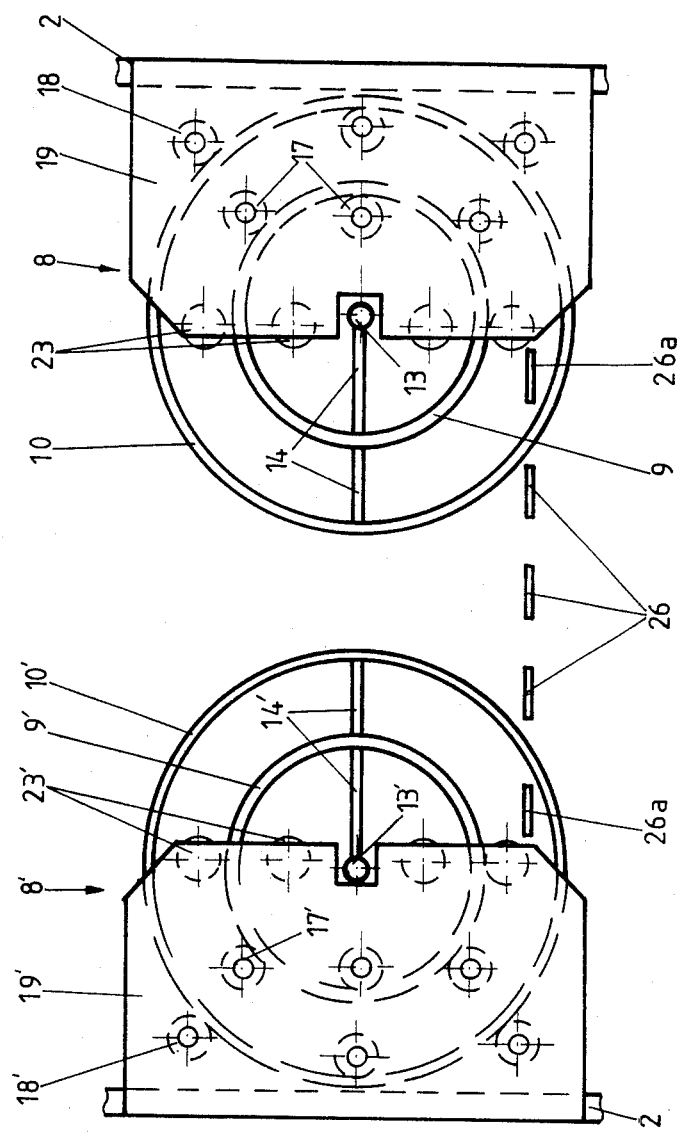

In the illustrative embodiment shown in FIG. 5, the stop 26 is adapted to be raised and is disposed between the two helical conveyors 8, 8'. The stop 26 depends below the upper level. The stop 26 is composite. One member 26a of the stop 26 is disposed between the two helical flights 9, 10 or 9', 10' of the two helical conveyors 8, 8'.

Figure 4:
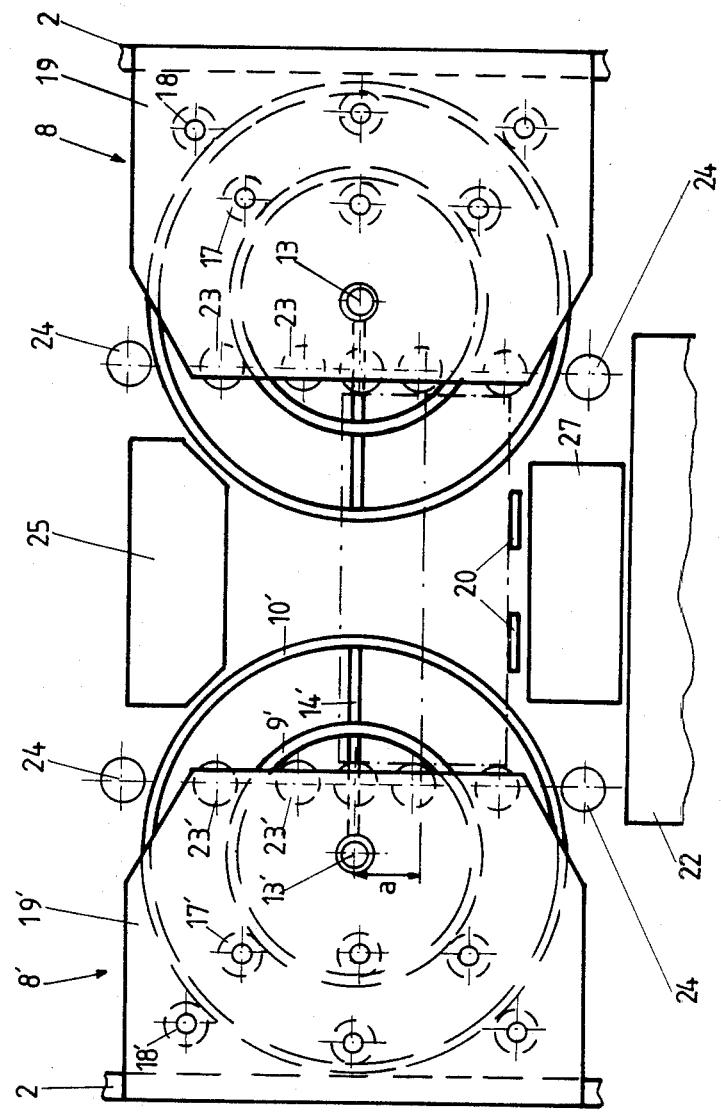
FIG. 4 is a top plan view that is similar to FIG. 2 and shows a different embodiment of the invention and FIG. 5 is a top plan view showing a different embodiment.

As is shown in FIGS. 4 and 5, the axis of rotation 13 or 13' of each helical conveyor may be offset by a distance a from the longitudinal center line of a wafer sheet which engages the stop member 20 or the stop 26.

A guiding surface 27 or the like for supporting the wafer block from below may be associated with the stop and disposed in the region between the two helical conveyors and may terminate short of the delivery conveyor.

Instead of two helical flights, each helical conveyor 8 or 8' may comprise three or more helical flights, which together with the helical flights of the other helical conveyor 8' or 8 define a common imaginary surface and support each wafer sheet on said imaginary surface.

In order to avoid an excessive stress of the low-strength wafer sheets which have been coated, the radial spacing of adjacent helical flights of each helical conveyor should amount to 10 to 20% of the extent of each wafer sheet in the direction which is transverse to the direction of travel.

The diameters of the helical flights of the two helical conveyors 8 and 8' are preferably so selected that the helical flights are uniformly distributed over the region between the axes of rotation of the helical conveyors.

The diameter of the outermost helical flight is preferably 1.5 to 2.5 times the extent of each wafer sheet in the direction of travel.

What is claimed is:

1. In apparatus for assembling coated wafer sheets to form a wafer block, comprising two laterally spaced apart helical conveyors rotatable about respective parallel, substantially vertical axes of rotation and arranged to receive on one side on a first level successive individual wafer sheets coated on their top side, drive means for rotating said helical conveyors about said axes of rotation in such opposite senses that said helical conveyors move each of said wafer sheets thus received in a predetermined direction to travel toward the opposite side of said helical conveyors and raise said wafer sheet above said first level, and stop means disposed on said opposite side of said helical conveyors and movable between operative and inoperative positions, said stop means in said operative position being arranged to engage each of said wafer sheets on said helical conveyors during the rotation thereof so that said helical conveyors are operable to raise each of said wafer sheets engaging said stop means to a second level and join said wafer sheet to an overlying wafer sheet previously disposed on said second level and thus to assemble a plurality of said wafer sheets in a wafer block, and said stop means in said inoperative position being arranged to permit said helical conveyors to deliver said wafer block on said second level on said opposite side of said helical conveyors, the improvement comprising at least two parallel helical wire flights constituting each one of said helical conveyors and surrounding the axis of rotation of the helical conveyor, the helical wire flights of each conveyor being radially spaced apart with respect to said axis, and said helical flights of said helical conveyors defining a common imaginary surface supporting each of said wafer sheets.

2. The improvement set forth in claim 1, further comprising a delivering conveyor for receiving each of said wafer blocks from said helical conveyors on said opposite side thereof.

3. The improvement set forth in claim 1, comprising two series of laterally spaced apart guide rollers having vertical axes adjacent to respective ones of said helical conveyors.

each of said series defining a vertical plane extending in the direction from said one side to said opposite side of said helical conveyors, at least part of said guide rollers of each of said series being disposed radially inwardly of respective helical flights of the associated helical conveyor and said guide rollers being arranged to guide each of said wafer sheets in said helical conveyors on opposite sides of said wafer sheet.

4. The improvement set forth in claim 1, comprising a guide plate for supporting each of said wafer sheets on said one side of said helical conveyors, the guide plate extending between said helical conveyors on said first level.

5. The improvement set forth in claim 4, wherein said guide plate is upwardly inclined in said direction of travel to said first level.

6. The improvement set forth in claim 1, wherein said stop means are disposed between said helical conveyors, and, comprising a guide plate for supporting said wafer block on said opposite side of said helical conveyor beyond said stop means, the guide plate extending between said helical conveyors on said second level.

7. The improvement set forth in claim 5, wherein said guide plate is upwardly inclined in said direction of travel to said second level.

8. The improvement set forth in claim 1 as applied to apparatus for forming wafer blocks from wafer sheets having a predetermined extent transversely to said direction of travel, wherein the radial distance between adjacent helical flights of each of said helical conveyors is 10 to 20% of said extent of said wafer sheets.

9. The improvement set forth in claim 1, wherein said helical flights of both said helical conveyors are regularly spaced apart in the region between said axes of rotation.

10. The improvement set forth in claim 1 as applied to apparatus for forming wafer blocks from wafer sheets having a predetermined extent in said direction of travel, wherein said diameter of the radially outermost helical flight of each of said helical conveyors is 1.5 to 2.5 times said extent of each wafer sheet.

11. The improvement set forth in claim 1 as applied to apparatus for forming wafer blocks from wafer sheets having a predetermined extent in said direction of travel, wherein said axes of rotation and said stop means are so arranged that said axes of rotation are offset from the longitudinal center line of a wafer sheet lying on said helical conveyors and engaging said stop means.

12. In apparatus for assembling coated wafer sheets to form a wafer block, comprising two laterally spaced apart helical conveyors, the conveyors being oppositely handed, rotatable about respective parallel, substantially vertical axes of rotation and arranged to receive on one side on a first level successive individual wafer sheets coated on their top side, drive means for rotating said helical conveyors about said axes of rotation at the same angular velocity and in such opposite senses that said helical conveyors move each of said wafer sheets thus received in a predetermined direction of travel toward the opposite side of said helical conveyors and raise said wafer sheet above said first level, and stop means disposed on said opposite side of said helical conveyors and movable between operative and inoperative positions, said stop means in said operative position being arranged to engage each of said wafer sheets on said helical conveyors during the rotation thereof so that said helical conveyors are operable to raise each of said wafer sheets engaging said stop means to a second level and join said wafer sheet to an overlying wafer sheet previously disposed on said second level and thus to assemble a plurality of said wafer sheets in a wafer block, and said stop means in said inoperative position being arranged to permit said helical conveyors to deliver said wafer block on said second level on said opposite side of said helical conveyors, the improvement comprising at least two parallel helical wire flights constituting each one of said helical conveyors and surrounding the axis of rotation of the helical conveyor, the helical wire flights of each conveyor being radially spaced apart with respect to said axis, and said helical flights are so arranged that any straight line which is normal to and connects said two axes of rotation and intersects one of said helical flights intersects all other flights of both said helical conveyors.

* * * * *